US010619672B2

(12) United States Patent
Lin et al.

(10) Patent No.: US 10,619,672 B2
(45) Date of Patent: Apr. 14, 2020

(54) LUBRICATABLE BALL SPLINE DEVICE

(71) Applicant: HIWIN TECHNOLOGIES CORP., Taichung (TW)

(72) Inventors: Wei-Chou Lin, Taichung (TW); Cheng-Ming Su, Taichung (TW); Cheng-Lung Wang, Taichung (TW); Po-Jung Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 36 days.

(21) Appl. No.: 15/699,133

(22) Filed: Sep. 8, 2017

(65) Prior Publication Data
US 2019/0078681 A1 Mar. 14, 2019

(51) Int. Cl.
*F16C 33/66* (2006.01)
*F16C 19/18* (2006.01)
(Continued)

(52) U.S. Cl.
CPC ............ *F16C 33/66* (2013.01); *F16C 19/187* (2013.01); *F16C 29/04* (2013.01);
(Continued)

(58) Field of Classification Search
CPC .... F16H 57/043; F16H 57/04; F16H 57/0406; F16H 57/042; Y10T 74/18744; F16C 33/66; F16C 33/6629; F16C 33/6659; F16C 9/02; F16C 9/14; F16C 9/18; F16C 9/184; F16C 9/185; F16C 29/00; F16C 29/005; F16C 29/007; F16C 29/008; F16C 29/06; F16C 29/0604; F16C 29/0611; F16C 29/0678; F16C 29/068;
(Continued)

(56) References Cited

U.S. PATENT DOCUMENTS 5,014,568 A * 5/1991 Schlenker ........... F16H 25/2214
74/424.86
5,809,838 A * 9/1998 Miyaguchi .......... F16H 25/2214
74/89.44
(Continued)

FOREIGN PATENT DOCUMENTS

DE 10107706 A1 10/2002
DE 102006056911 A1 * 6/2008 .............. F16C 19/48
(Continued)

OTHER PUBLICATIONS

DPMA Office Action dated Jun. 6, 2018, for German Patent Application No. 10 2017 122 590.0 (counterpart application).

*Primary Examiner* — Victor L MacArthur
*Assistant Examiner* — Gregory Robert Weber
(74) *Attorney, Agent, or Firm* — Rosenberg, Klein & Lee

(57) ABSTRACT

A lubricatable ball spline device includes a ball spline shaft, a ball nut slidably sleeved on the ball spline shaft and having oil guide holes, a linear bearing unit mounted between the ball spline shaft and the ball nut, a bearing ring rotatably sleeved on the ball nut and having an oil supplying hole, a positioning portion disposed between the bearing ring and the ball nut, and an oil passage corresponding to the oil supplying hole. The oil supplying hole, the oil passage, an oil storage space of the positioning portion and any one of the oil guide holes cooperatively form a continuous oil path.

8 Claims, 4 Drawing Sheets

(51) Int. Cl.
  *F16C 29/04* (2006.01)
  *F16C 29/06* (2006.01)
  *F16C 31/04* (2006.01)
  *F16C 33/41* (2006.01)

(52) U.S. Cl.
  CPC .......... *F16C 29/0695* (2013.01); *F16C 31/04* (2013.01); *F16C 33/6629* (2013.01); *F16C 33/6659* (2013.01); *F16C 33/414* (2013.01)

(58) Field of Classification Search
  CPC ........ F16C 29/0683–0695; F16C 31/04; F16C 31/06; F16C 33/663; F16C 33/6681
  USPC ........................................................ 74/89.44
  See application file for complete search history.

(56) References Cited

U.S. PATENT DOCUMENTS

| | | | | |
|---|---|---|---|---|
| 6,155,717 A * | 12/2000 | Michioka | ............ | F16C 29/0642 384/15 |
| 6,364,058 B1 * | 4/2002 | Nishide | ............... | F16H 25/2418 184/5 |
| 6,732,600 B2 * | 5/2004 | Greubel | ............... | F16C 19/184 74/424.71 |
| 7,036,989 B2 * | 5/2006 | Taki | ...................... | F16C 19/386 384/462 |
| 7,234,368 B1 * | 6/2007 | Lin | ...................... | F16H 25/2214 74/424.83 |
| 7,634,952 B2 * | 12/2009 | Chen | ................... | F16H 57/0497 74/89.43 |
| 8,082,814 B2 * | 12/2011 | Jiang | ................... | F16H 57/0497 184/100 |
| 9,157,520 B2 * | 10/2015 | Chang | ................. | F16H 57/0497 |
| 9,759,311 B2 * | 9/2017 | Chu | ................... | F16H 57/0497 |
| 2008/0134816 A1 * | 6/2008 | Chen | ................... | F16C 25/2214 74/89.44 |
| 2012/0137808 A1 * | 6/2012 | Chen | ................... | F16H 25/2214 74/424.88 |

FOREIGN PATENT DOCUMENTS

| | | | | |
|---|---|---|---|---|
| DE | 202014103629 U1 | | 9/2014 | |
| JP | H11-201256 A | * | 7/1999 | .............. F16C 29/04 |
| JP | 2006336688 A | | 12/2006 | |
| JP | 2014047863 A | * | 3/2014 | .............. F16C 19/48 |
| TW | I444542 B | | 7/2014 | |
| TW | I444542 B | * | 11/2014 | .............. F16C 29/04 |
| WO | WO-2008013150 A1 | * | 1/2008 | .............. F16C 29/04 |

\* cited by examiner

LUBRICATABLE BALL SPLINE DEVICE

FIELD

The disclosure relates to a driving device of a processing machine, more particularly to a lubricatable ball spline device.

BACKGROUND

A ball spline device, as disclosed in U.S. Pat. No. 5,809,838, includes a screw shaft, a ball nut sleeved on the screw shaft, a first ball unit fitted between the screw shaft and the ball nut, a rolling bearing sleeved on the ball nut, and a second ball unit disposed between the ball nut and the rolling bearing. The rolling bearing has a first oil supplying hole formed in an outer race thereof. The ball nut has an inner peripheral surface, an outer peripheral surface, and a plurality of second oil supplying holes communicating with the first oil supplying hole through an annular gap. When lubricant oil is introduced into the ball spline device via the first oil supplying hole, the lubricant oil must fill up the annular gap before the lubricant oil can flow through the second supplying holes to a space between the screw shaft and the ball nut, thereby resulting in excessive oil and poor lubrication efficiency. Further, this type of ball spline device cannot produce a good lubricating effect for the first and second ball units.

Another ball spline device, as disclosed in Taiwanese Patent Publication No. 1444542, includes a screw shaft, a ball nut sleeved on an outer portion of the screw shaft, a first rolling ball unit disposed between the screw shaft and the ball nut, a bearing outer ring sleeved on the ball nut, and a second rolling ball unit disposed between the bearing outer ring and the ball nut. The ball nut has two spaced-apart protruding portions, an annular oil channel disposed between the protruding portions, and a plurality of oil holes extending radially through an inner peripheral face from the annular oil channel. The bearing outer ring has an oil supplying hole communicating with the annular oil channel. Although the provision of the protruding portions can prevent excessive lubrication of the lubricant oil on the second rolling ball unit, because the protruding portions are spaced apart from each other, the second rolling ball unit is not sufficiently lubricated.

SUMMARY

Therefore, an object of the present disclosure is to provide a lubricatable ball spline device that is capable of overcoming at least one of the drawbacks of the prior art.

Accordingly, a lubricatable ball spline device of this disclosure includes a ball spline shaft, a ball nut, a linear bearing unit, a bearing ring, an oil path accessory and an annular bearing unit. The ball spline shaft extends along an axis, and has a shaft outer peripheral surface, and a plurality of spaced-apart pairs of first ball-rolling grooves formed in the shaft outer peripheral surface and extending axially along a length of the ball spline shaft. The ball nut is slidably sleeved on the ball spline shaft and has a nut inner peripheral surface opposite to the shaft outer peripheral surface, a nut outer peripheral surface opposite to the nut inner peripheral surface, a plurality of oil guide holes extending through the nut inner and outer peripheral surfaces, a plurality of pairs of second ball-rolling grooves formed in the nut inner peripheral surface and respectively opposite to the pairs of first ball-rolling grooves, at least one annular third ball-rolling groove formed in the nut outer peripheral surface and surrounding the axis, and a communication channel formed in the nut outer peripheral surface and communicating with the at least one third ball-rolling groove.

The linear bearing unit is mounted between the shaft outer peripheral surface and the nut inner peripheral surface to permit the ball nut to move slidably relative to the ball spline shaft. The linear bearing unit has a first ball retainer, and a plurality of sets of first balls mounted in the first ball retainer. Each set of the first balls is disposed between one pair of the first ball-rolling grooves and a corresponding opposed pair of the second ball-rolling grooves. The bearing ring is rotatably sleeved on the ball nut and has a bearing ring inner peripheral surface opposite to the nut outer peripheral surface, a bearing ring outer peripheral surface opposite to the bearing ring inner peripheral surface, an oil supplying hole extending through the bearing ring inner and outer peripheral surfaces, and at least one annular fourth ball-rolling groove formed in the bearing ring inner peripheral surface and surrounding the axis. The at least one fourth ball-rolling groove is opposite to the at least one third ball-rolling groove.

The oil path accessory includes a positioning portion disposed between the bearing ring inner peripheral surface and the nut outer peripheral surface, and an oil passage corresponding in position to the oil supplying hole. The positioning portion has an oil storage space with an opening facing the nut outer peripheral surface and communicating with the oil passage. The oil supplying hole, the oil passage, the oil storage space and any one of the oil guide holes cooperatively form a continuous oil path extending from the bearing ring outer peripheral surface to the nut inner peripheral surface. The annular bearing unit is mounted between the nut outer peripheral surface and the bearing ring inner peripheral surface to permit the bearing ring to rotate relative to the ball nut. The annular bearing unit has a second ball retainer, and a plurality of second balls mounted in the second ball retainer. The second balls are disposed between the at least one third ball-rolling groove and the at least one fourth ball-rolling groove.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
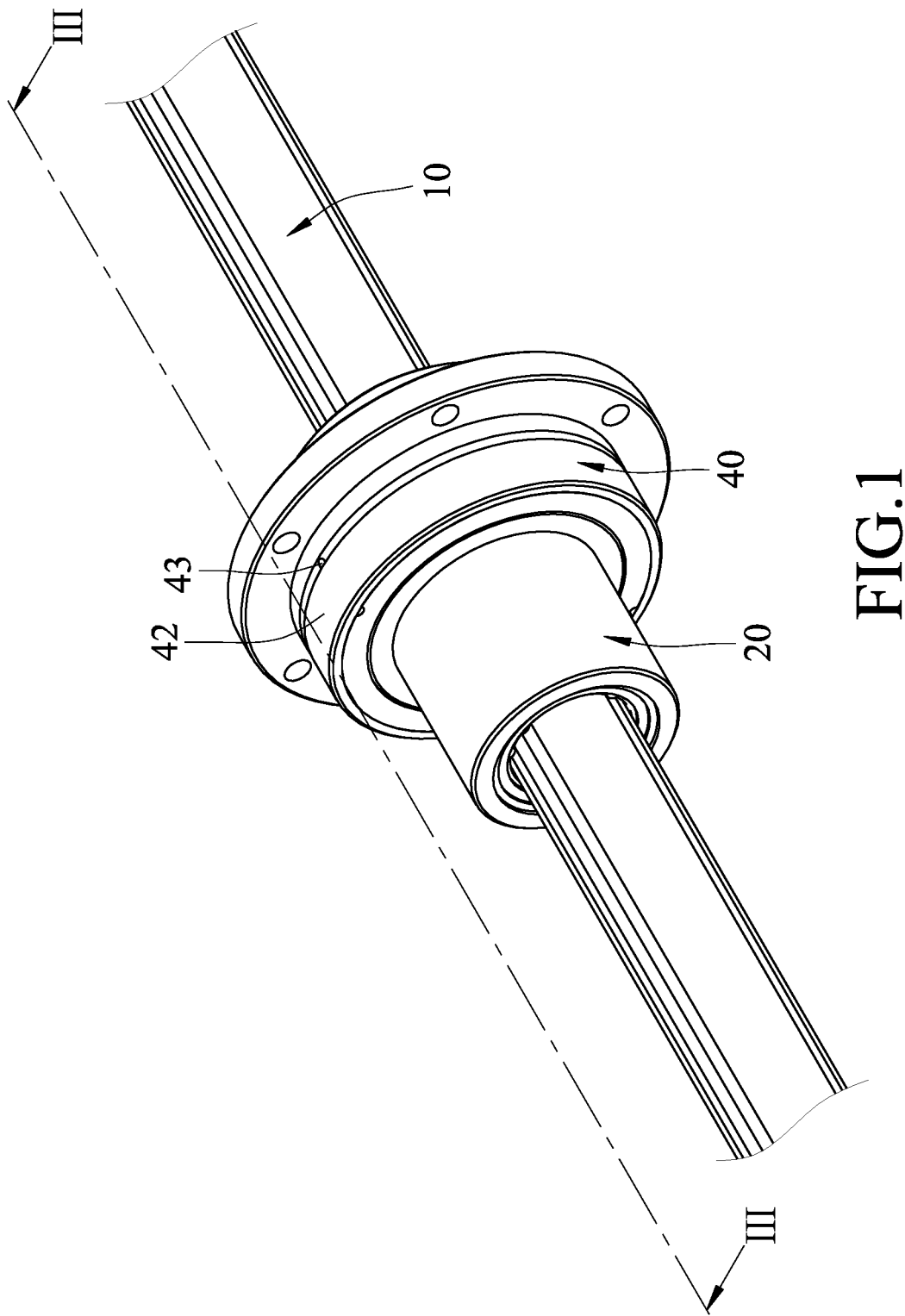
FIG. 1 is a fragmentary perspective view of a lubricatable ball spline device according to the embodiment of this disclosure.
Figure 2:
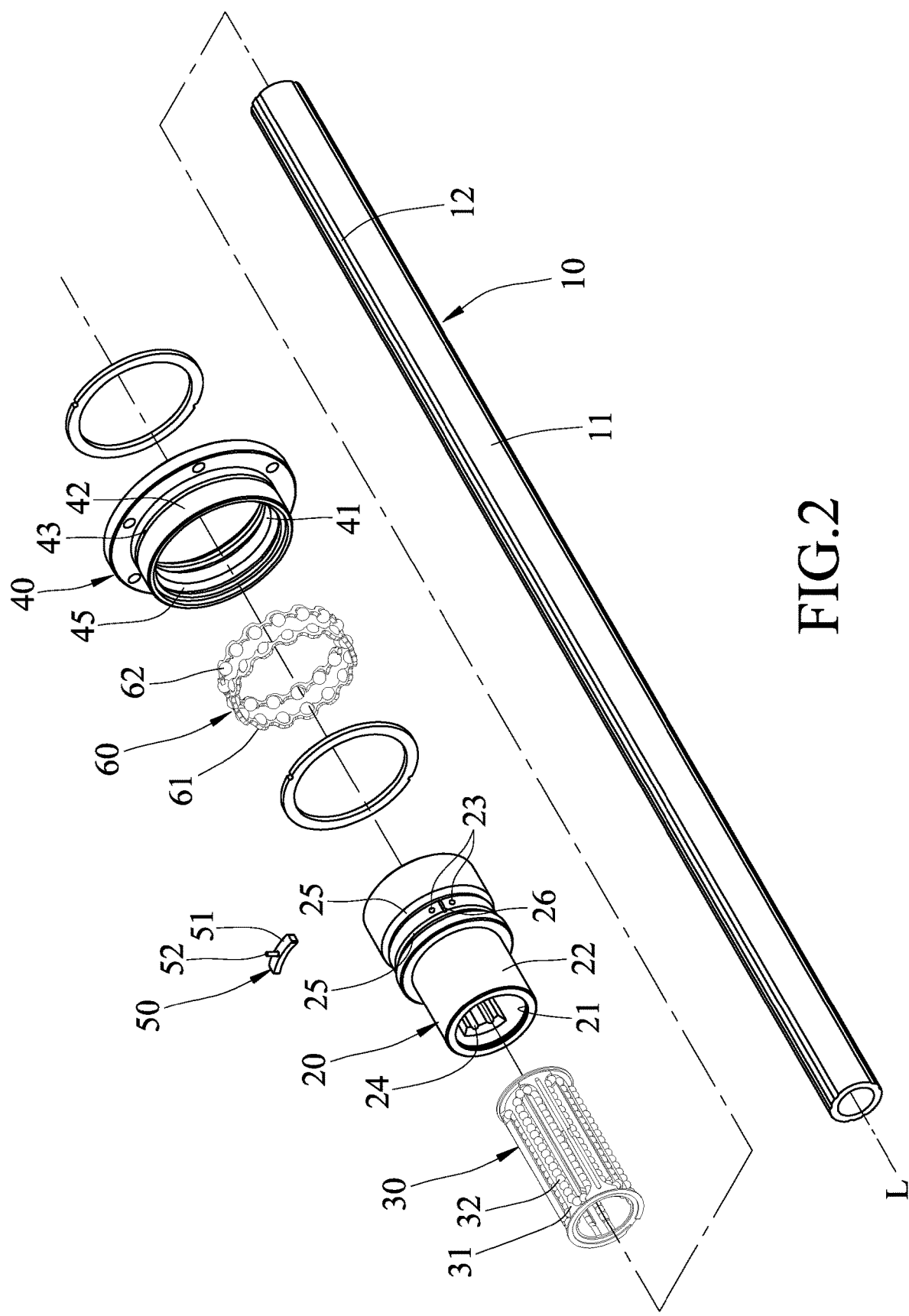
FIG. 2 is an exploded perspective view of the embodiment.

Referring to FIGS. 1 to 4, a lubricatable ball spline device according to the embodiment of the present disclosure is shown to comprise a shaft 10 (which is configured in the illustrated embodiment to be a ball spline shaft), a ball nut 20, a linear bearing unit 30, a bearing ring 40, an oil path accessory 50 and an annular bearing unit 60.

Figure 4:
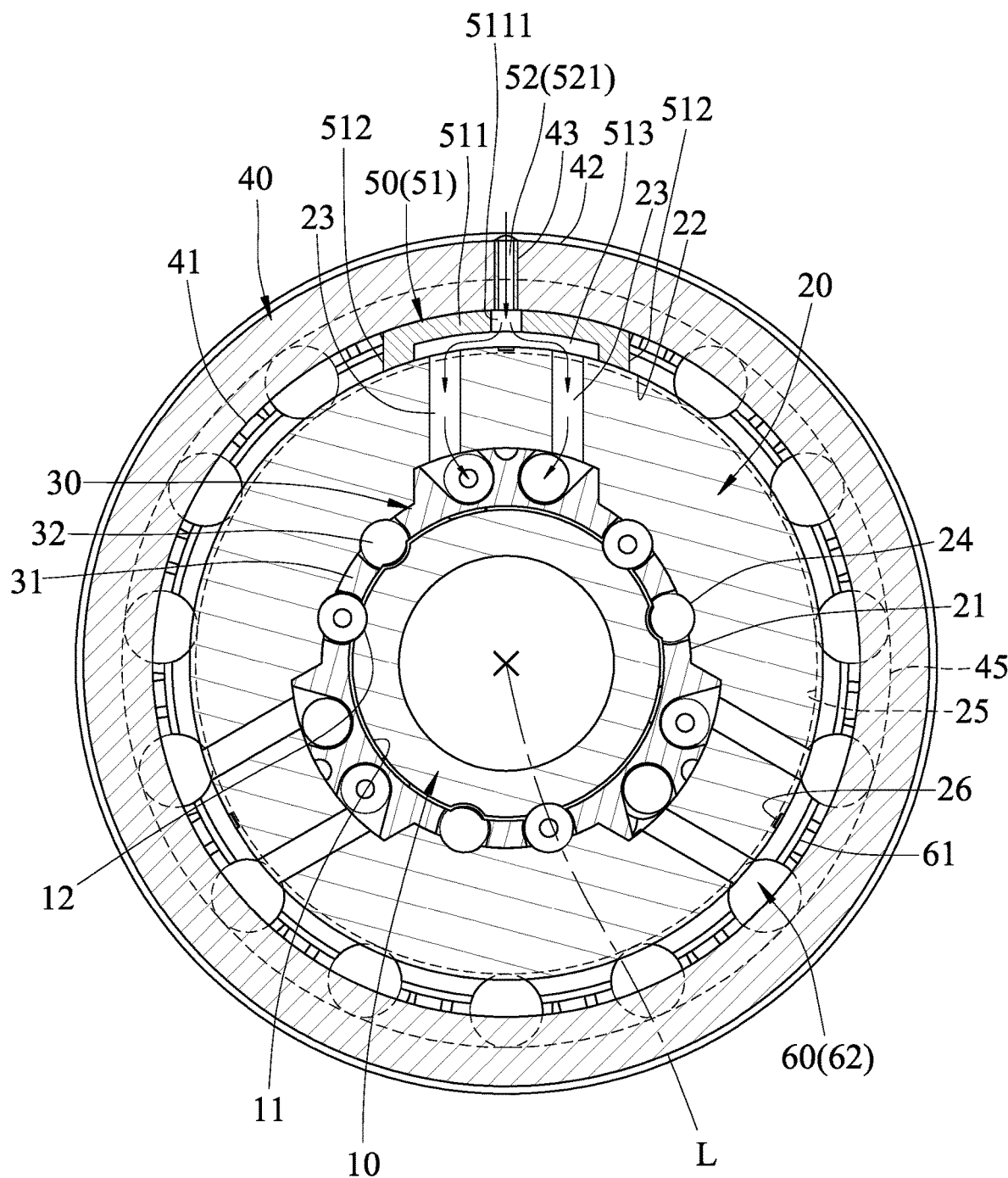
FIG. 4 is a sectional view of the embodiment taken along line IV-IV of FIG. 3.

The ball spline shaft 10 extends along an axis (L), and has a shaft outer peripheral surface 11, and a plurality of pairs of first ball-rolling grooves 12 formed in the shaft outer peripheral surface 11 and extending axially along a length of the ball spline shaft 10. As shown in FIG. 4, the ball spline shaft 10 is provided with three pairs of first ball-rolling grooves 12 that surround the axis (L) and that are angularly spaced apart from each other by 120 degrees.

The ball nut 20 is sleeved on the ball spline shaft 10 and is slidable along the length thereof. The ball nut 20 has a nut inner peripheral surface 21 opposite to the shaft outer peripheral surface 11, a nut outer peripheral surface 22 opposite to the nut inner peripheral surface 21, a plurality of oil guide holes 23 extending through the inner and outer peripheral surfaces 21, 22, a plurality of pairs of second ball-rolling grooves 24 formed in the nut inner peripheral surface 21 and respectively opposite to the pairs of first ball-rolling grooves 12, two annular third ball-rolling grooves 25 formed in the nut outer peripheral surface 22 and surrounding the axis (L), and a plurality of communication channels 26 formed in the nut outer peripheral surface 22 and parallel to the axis (L). The oil guide holes 23 are arranged in pairs. In this embodiment, the ball nut 20 is provided with three pairs of oil guide holes 23 that surround the axis (L) and that are angularly spaced apart from each other by 120 degrees. The oil guide holes 23 are disposed between the third ball-rolling grooves 25. The third ball-rolling grooves 25 are axially spaced apart from each other. The communication channels 26 are disposed between and are communicated with the third ball-rolling grooves 25. Each communication channel 26 is located between two oil guide holes 23 of each pair.

The linear bearing unit 30 is mounted between the shaft outer peripheral surface 11 and the nut inner peripheral surface 21 to permit the ball nut 20 to move slidably relative to the ball spline shaft 10. The linear bearing unit 30 includes a first ball retainer 31, and a plurality of sets of first balls 32 mounted in the first ball retainer 31. Each set of the first balls 32 is disposed between one pair of the first ball-rolling grooves 12 and a corresponding opposed pair of the second ball-rolling grooves 24.

The bearing ring 40 is rotatably sleeved on the ball nut 20, and has a bearing ring inner peripheral surface 41 opposite to the nut outer peripheral surface 22, a bearing ring outer peripheral surface 42 opposite to the bearing ring inner peripheral surface 41, an oil supplying hole 43 extending through the bearing ring inner and outer peripheral surfaces 41, 42, and two annular fourth ball-rolling grooves 45 formed in the bearing ring inner peripheral surface 41 and surrounding the axis (L). The fourth ball-rolling grooves 45 are respectively opposite to the third ball-rolling grooves 25.

The oil path accessory 50 includes a positioning portion 51 disposed between the bearing ring inner peripheral surface 41 and the nut outer peripheral surface 22, and a connecting pipe 52 connected to the positioning portion 51. The positioning portion 51 has an inverted U-shaped cross section, and includes an arcuate bight portion 511 abutting against the bearing ring inner peripheral surface 41, two leg portions 512 extending downwardly and respectively from two opposite ends of the bight portion 511 and abutting against the nut outer peripheral surface 22, and an oil storage space 513 cooperatively defined by the bight portion 511 and the leg portions 512 and having an opening facing the nut outer peripheral surface 22. The connecting pipe 52 is disposed in the oil supplying hole 43, and defines an oil passage 521 communicating with the oil storage space 513 through a hole 5111 in the bight portion 511. The oil supplying hole 43, the oil passage 521 and the oil storage space 513 and any one of the oil guide holes 23 cooperatively form a continuous oil path extending from the bearing ring outer peripheral surface 42 to the nut inner peripheral surface 21. Further, as shown in FIG. 4, two oil guide holes 23 of each pair are spaced apart by an angular distance smaller than an angular width of the oil storage space 513 relative to the axis (L). The positioning portion 51 of this embodiment is made of a low coefficient of friction or porous material, such as plastic or felt having a coefficient of friction of 0.2 to 0.3.

The annular bearing unit 60 is mounted between the nut outer peripheral surface 22 and the bearing ring inner peripheral surface 41 to permit the bearing ring 40 to smoothly rotate relative to the ball nut 20, and includes a second ball retainer 61, and two sets of second balls 62 mounted in the second ball retainer 61. Each set of the second balls 62 is disposed between one of the third ball-rolling grooves 25 and the respective fourth ball-rolling groove 45.

Figure 3:
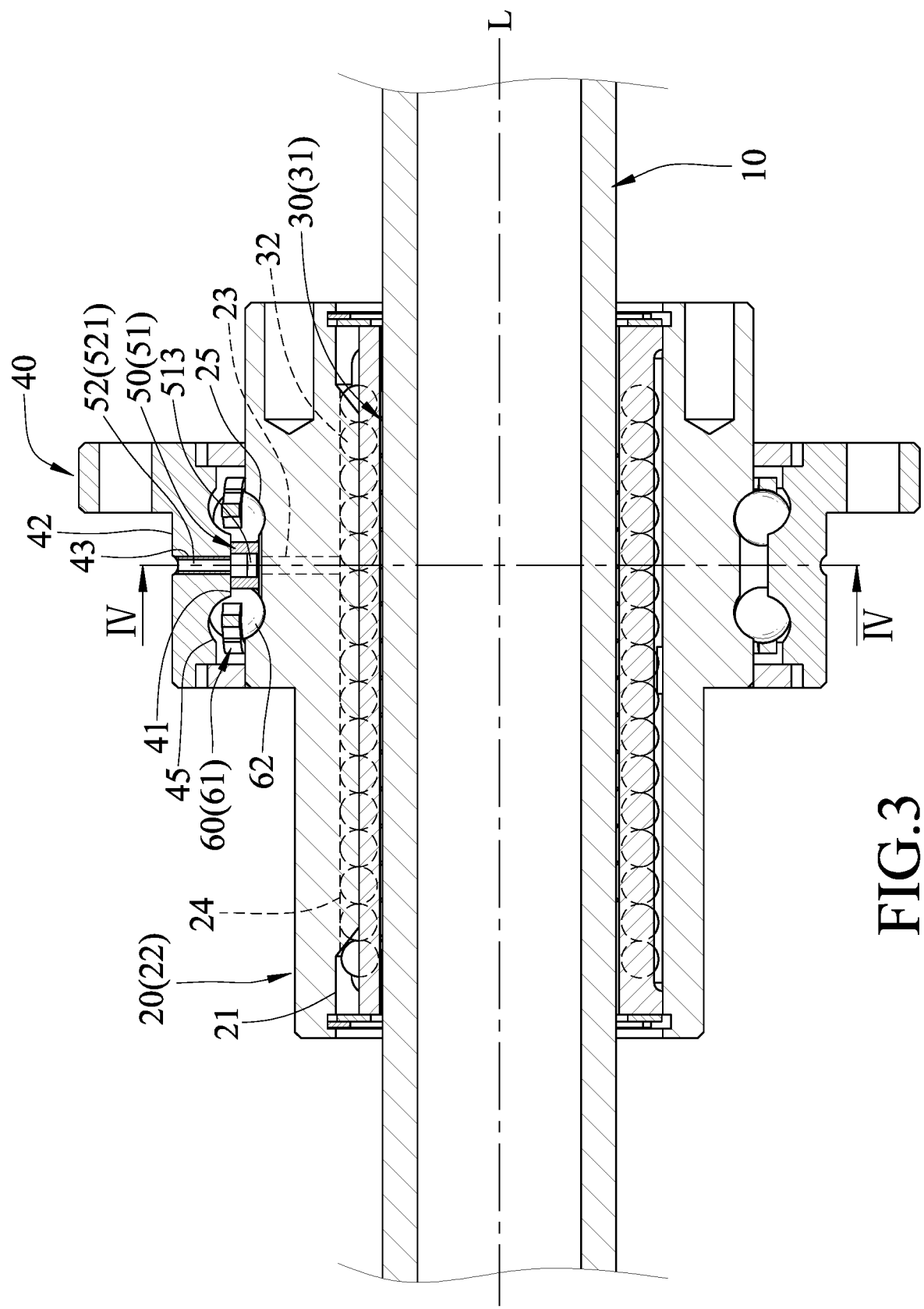
FIG. 3 is a sectional view of the embodiment taken along line of FIG. 1.

With reference to FIGS. 3 and 4, when lubricant oil is introduced into the ball spline device of this disclosure through the oil supplying hole 43, the lubricant oil (see the arrows shown in FIG. 4) will flow into the oil storage space 513 through the oil supplying hole 43, the oil passage 521 and the hole 5111 in the bight portion 511. When the oil path accessory 50 rotates along with the bearing ring 40 to a position above any one pair of the oil guide holes 23, the lubricant oil can directly lubricate the linear bearing unit 30 disposed between the ball spline shaft 10 and the ball nut 20 through the continuous oil path to provide a smooth linear movement of the ball nut 20 relative to the ball spline shaft 10. When the oil path accessory 50 is moved away from a position above any one pair of the oil guide holes 23, the lubricant oil is stored in the oil storage space 513, and will not conduct lubrication, so that excessive lubrication can be prevented.

Hence, in this disclosure, through the cooperation of the oil path accessory 50 and the oil guide holes 23, a communication path of the continuous oil path can be increased, and an effect of storing the lubricant oil can be achieved, so that lubrication of the linear bearing unit 30 can be conducted and excessive lubrication of the linear bearing unit 30 can be prevented. Further, because the positioning portion 51 of this embodiment is made of a low frictional coefficient or porous material, wearing of the two leg portions 512 of the positioning portion 51 can be prevented during rotation of the bearing ring 40 relative to the ball nut 20 so as to ensure tight sealing of the continuous oil path.

Moreover, with the communication channels 26 communicating with the third ball-rolling grooves 25, when the lubricant oil is introduced into the oil supplying hole 43, and the oil path accessory 50 is moved to a position above any one of the communication channels 26, the lubricant oil can flow uniformly to two opposite sides of the annular bearing unit 60 through the oil storage space 513 and the one of the communication channels 26 to lubricate the second balls 62. Thus, a good lubricating effect is obtained.

Therefore, the object of this invention can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A lubricatable ball spline device comprising:
a shaft extending along an axis and having:
   a shaft outer peripheral surface, and
   a plurality of pairs of first ball-rolling grooves formed in said shaft outer peripheral surface and angularly spaced apart from each other, each of said pairs of first ball-rolling grooves extending axially along a length of said shaft;
a ball nut slidably sleeved on said shaft and having:
   a nut inner peripheral surface facing said shaft outer peripheral surface,
   a nut outer peripheral surface opposite to said nut inner peripheral surface,
   a plurality of oil guide holes, each of said plurality of guide holes extends between open ends respectively formed in said nut inner and outer peripheral surfaces,
   a plurality of pairs of second ball-rolling grooves formed in said nut inner peripheral surface and respectively facing said pairs of first ball-rolling grooves,
   at least one annular third ball-rolling groove formed in said nut outer peripheral surface and surrounding the axis, and
   a communication channel formed in said nut outer peripheral surface and communicating with said at least one third ball-rolling groove;
a linear bearing unit mounted between said shaft outer peripheral surface and said nut inner peripheral surface to permit said ball nut to move slidably relative to said shaft, said linear bearing unit including:
   a first ball retainer, and
   a plurality of sets of first balls mounted in said first ball retainer, each set of said first balls being disposed between one pair of said first ball-rolling grooves and a corresponding facing pair of said second ball-rolling grooves;
a bearing ring rotatably sleeved on said ball nut and having:
   a bearing ring inner peripheral surface facing said nut outer peripheral surface,
   a bearing ring outer peripheral surface opposite to said bearing ring inner peripheral surface,
   an oil supplying hole extending through said bearing ring inner and outer peripheral surfaces, and
   at least one annular fourth ball-rolling groove formed in said bearing ring inner peripheral surface and surrounding the axis, said at least one fourth ball-rolling groove facing said at least one third ball-rolling groove;
an oil path accessory including:
   a positioning portion disposed between said bearing ring inner peripheral surface and said nut outer peripheral surface, said positioning portion abutting said bearing ring inner peripheral surface and abutting said nut outer peripheral surface, and
   an oil passage corresponding in position to said oil supplying hole, said positioning portion having an oil storage space with an opening facing said nut outer peripheral surface and communicating with said oil passage, wherein said oil supplying hole, said oil passage, said oil storage space, and any one of said oil guide holes cooperatively form a first continuous oil path extending from said bearing ring outer peripheral surface to said nut inner peripheral surface, and wherein a second continuous oil path is defined to extend through said oil passage between said bearing ring outer peripheral surface and said at least one third ball-rolling groove; and
an annular bearing unit mounted between said nut outer peripheral surface and said bearing ring inner peripheral surface to permit said bearing ring to rotate relative to said ball nut, said annular bearing unit including:
   a second ball retainer, and
   a plurality of second balls mounted in said second ball retainer, said second balls being disposed between said at least one third ball-rolling groove and said at least one fourth ball-rolling groove;
wherein said communication channel is located on a radial inner side of said oil path accessory when said oil path accessory rotates along with said annular bearing ring relative to said ball nut to a position above any one of said oil guide holes; and
wherein said positioning portion has an inverted U-shaped cross section, and includes an arcuate bight portion abutting against said bearing ring inner peripheral surface, and two leg portions extending downwardly and respectively from two opposite circumferential ends of said bight portion and abutting against said nut outer peripheral surface, said oil storage space being cooperatively defined by said bight portion and said leg portions.

2. The lubricatable ball spline device as claimed in claim 1, wherein said oil guide holes are arranged in pairs, and two oil guide holes of each pair are spaced apart by an angular distance smaller than an angular width of said oil storage space relative to the axis.

3. The lubricatable ball spline device as claimed in claim 1, wherein said ball nut has two of said third ball-rolling grooves, said third ball-rolling grooves being axially spaced apart from each other, said communication channel being disposed between and being communicated with said third ball-rolling grooves, said bearing ring having two of said fourth ball-rolling grooves disposed respectively correspondingly facing said third ball-rolling grooves.

4. The lubricatable ball spline device as claimed in claim 3, wherein said oil guide holes are arranged in pairs, and said pairs of said oil guide holes surround the axis, are equiangularly spaced apart from each other, and said open ends thereof formed in said nut outer peripheral surface are located between said two third ball-rolling grooves.

5. The lubricatable ball spline device as claimed in claim 1, wherein said oil path accessory further includes a connecting pipe connected to said positioning portion and disposed in said oil supplying hole, and said connecting pipe defines said oil passage.

6. The lubricatable ball spline device as claimed in claim 1, wherein said positioning portion is made of plastic.

7. The lubricatable ball spline device as claimed in claim 1, wherein said positioning portion is made of felt.

8. A lubricatable ball spline device comprising:
a shaft extending along an axis and having:
   a shaft outer peripheral surface, and
   a plurality of pairs of first ball-rolling grooves formed in said shaft outer peripheral surface and angularly spaced apart from each other, each of said pairs of first ball-rolling grooves extending axially along a length of said shaft;
a ball nut slidably sleeved on said shaft and having:
   a nut inner peripheral surface facing said shaft outer peripheral surface,
   a nut outer peripheral surface opposite to said nut inner peripheral surface, a plurality of oil guide holes, each of said plurality of guide holes extends between open ends respectively formed in said nut inner and outer peripheral surfaces, a plurality of pairs of second ball-rolling grooves formed in said nut inner peripheral surface and respectively facing said pairs of first ball-rolling grooves, at least one annular third ball-rolling groove formed in said nut outer peripheral surface and surrounding the axis, and a communication channel formed in said nut outer peripheral surface and communicating with said at least one third ball-rolling groove;

a linear bearing unit mounted between said shaft outer peripheral surface and said nut inner peripheral surface to permit said ball nut to move slidably relative to said shaft, said linear bearing unit including:

a first ball retainer, and a plurality of sets of first balls mounted in said first ball retainer, each set of said first balls being disposed between one pair of said first ball-rolling grooves and a corresponding facing pair of said second ball-rolling grooves;

a bearing ring rotatably sleeved on said ball nut and having:

a bearing ring inner peripheral surface facing said nut outer peripheral surface, a bearing ring outer peripheral surface opposite to said bearing ring inner peripheral surface, an oil supplying hole extending through said bearing ring inner and outer peripheral surfaces, and at least one annular fourth ball-rolling groove formed in said bearing ring inner peripheral surface and surrounding the axis, said at least one fourth ball-rolling groove facing said at least one third ball-rolling groove;

an oil path accessory movable relative to said ball nut between first and second positions, said oil path accessory including:

a positioning portion disposed between said bearing ring inner peripheral surface and said nut outer peripheral surface, said positioning portion abutting said bearing ring inner peripheral surface and abutting said nut outer peripheral surface, and an oil passage corresponding in position to said oil supplying hole, said positioning portion having an oil storage space with an opening facing said nut outer peripheral surface and communicating with said oil passage, wherein said oil supplying hole, said oil passage, said oil storage space, and any one of said oil guide holes communicate to cooperatively form a first continuous oil path extending from said bearing ring outer peripheral surface to said nut inner peripheral surface when said oil path accessory is disposed in the first position, and wherein a second continuous oil path is defined to extend through said oil passage between said bearing ring outer peripheral surface and said at least one third ball-rolling groove; and an annular bearing unit mounted between said nut outer peripheral surface and said bearing ring inner peripheral surface to permit said bearing ring to rotate relative to said ball nut, said annular bearing unit including:

a second ball retainer, and a plurality of second balls mounted in said second ball retainer, said second balls being disposed between said at least one third ball-rolling groove and said at least one fourth ball-rolling groove;

wherein when said oil path accessory is disposed in the second position, said oil storage space is blocked from communicating with any one of said oil guide holes, said oil path accessory in the second position thereby interrupting said first continuous oil path.

* * * * *